4 Sheets—Sheet 1.

A. B. GLOVER.
Paper-Bag Machine.

No. 200,654. Patented Feb. 26, 1878.

Witnesses.

Inventor.

4 Sheets—Sheet 2.
A. B. GLOVER.
Paper-Bag Machine.
No. 200,654. Patented Feb. 26, 1878.
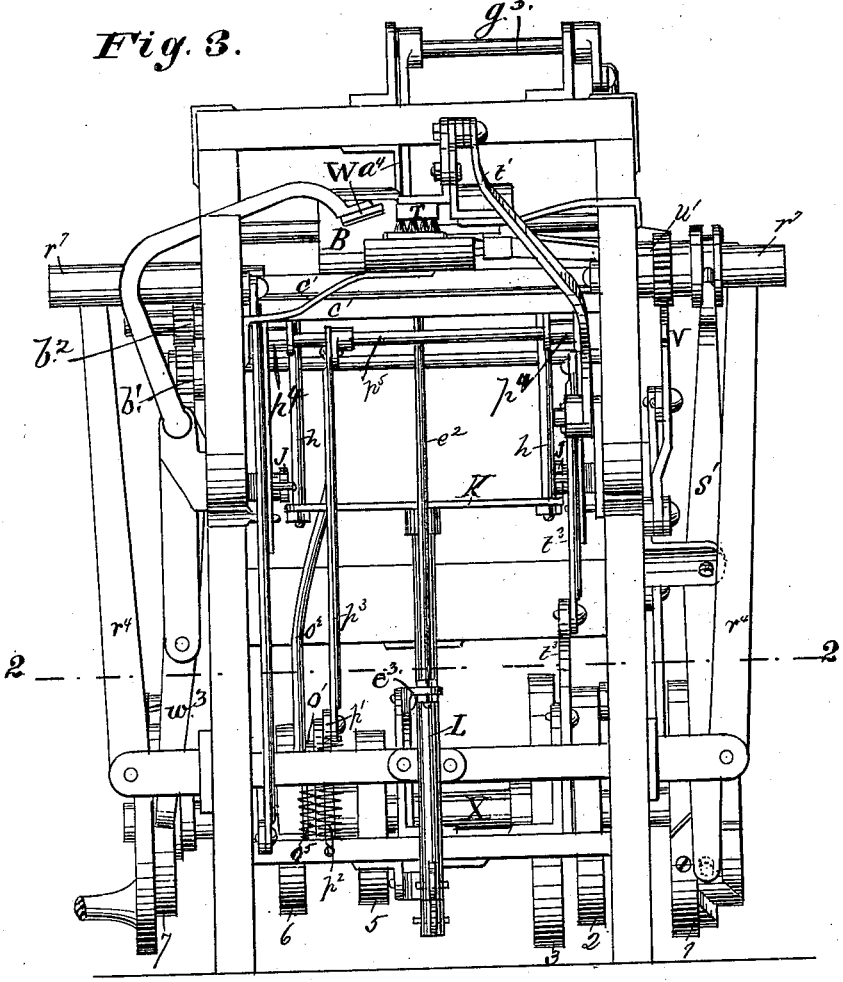
Fig. 3.
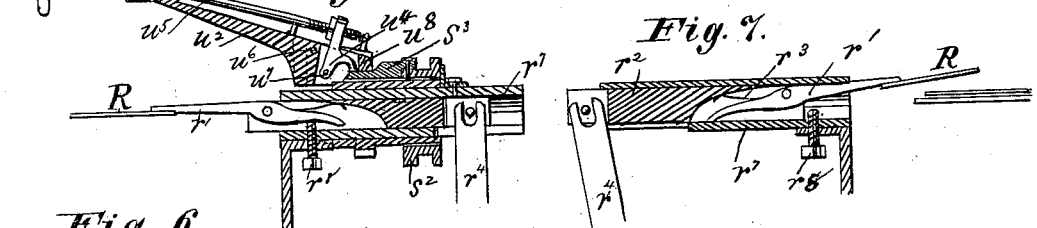
Fig. 5.   Fig. 7.
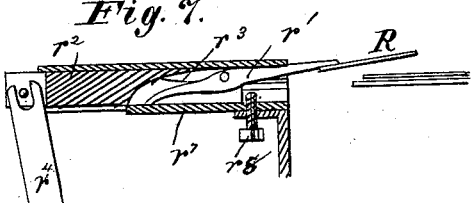
Fig. 6.
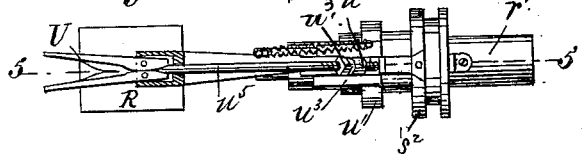
Witnesses.   Inventor.

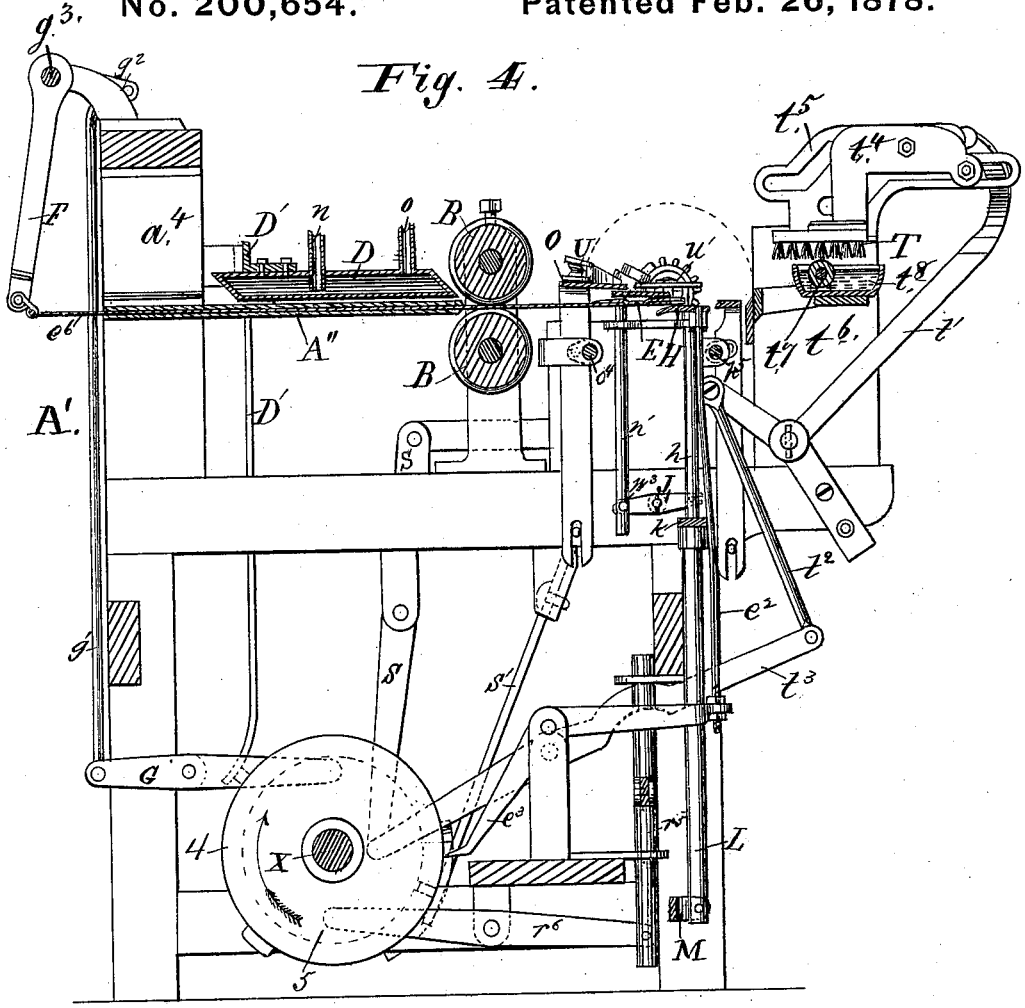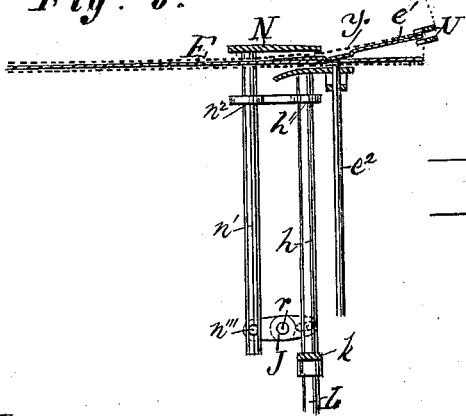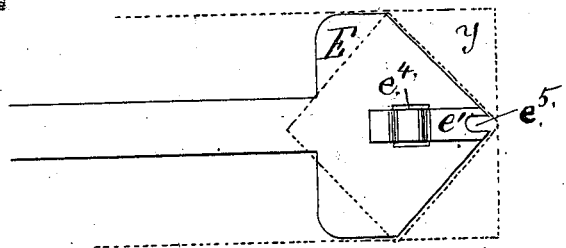

4 Sheets—Sheet 4.

A. B. GLOVER.
Paper-Bag Machine.

No. 200,654. Patented Feb. 26, 1878.

Witnesses.
Jac. Scheitlin
Penn Halsted

Inventor.
Almon B. Glover
per John Halsted
Atty.

UNITED STATES PATENT OFFICE.

ALMON B. GLOVER, OF BIRMINGHAM, ASSIGNOR OF ONE-HALF HIS RIGHT TO DAVID W. PLUMB, OF HUNTINGTON, CONNECTICUT.

IMPROVEMENT IN PAPER-BAG MACHINES.

Specification forming part of Letters Patent No. 200,654, dated February 26, 1878; application filed August 18, 1877.

*To all whom it may concern:*

Be it known that I, ALMON B. GLOVER, of Birmingham, in the county of New Haven and State of Connecticut, have invented certain new and useful Improvements in Machines for Making Paper Bags; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to that class of machines into which a strip of paper is fed from a roll and automatically formed into a continuous tube, and thence into a completed bag.

The main objects of the invention are to receive, guide, fold, and unite together the edges of the strip which have previously been pasted by any well-known apparatus, to warm, partially dry, and set this paste, so that these edges will not readily separate during the subsequent operations of folding the bottom of the bag after a sufficient portion of such closed strip or tube to form a bag has been automatically cut off, and to close up by pasting and automatic folding that end of the severed tube which is to form the bottom, and to do this continuously and rapidly.

The distinct novel features of my invention are more particularly hereinafter set forth and claimed.

Assuming that the roll of paper to be converted into bags is first wound upon a delivering-roll, and then has one of its edges guided by means of an appropriate roll or rolls to a pasting apparatus adapted to deposit a narrow streak of paste near one edge of the paper, to serve for forming the side seam, and thence under straight-edge guides, whereby it may be folded over them, so as to lap its edges, I will now proceed to describe my invention, which may be said to take the paper at this stage and carry it through all the subsequent operations up to the completion of the finished bag.

Figure 1:
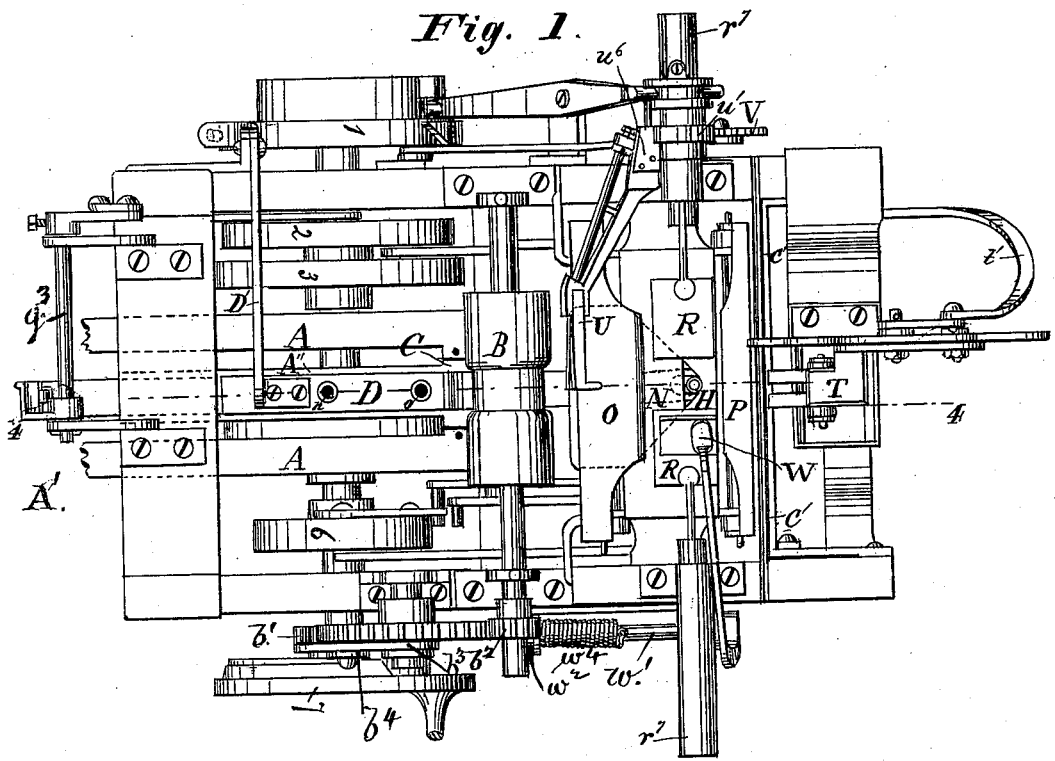
Figure 2:
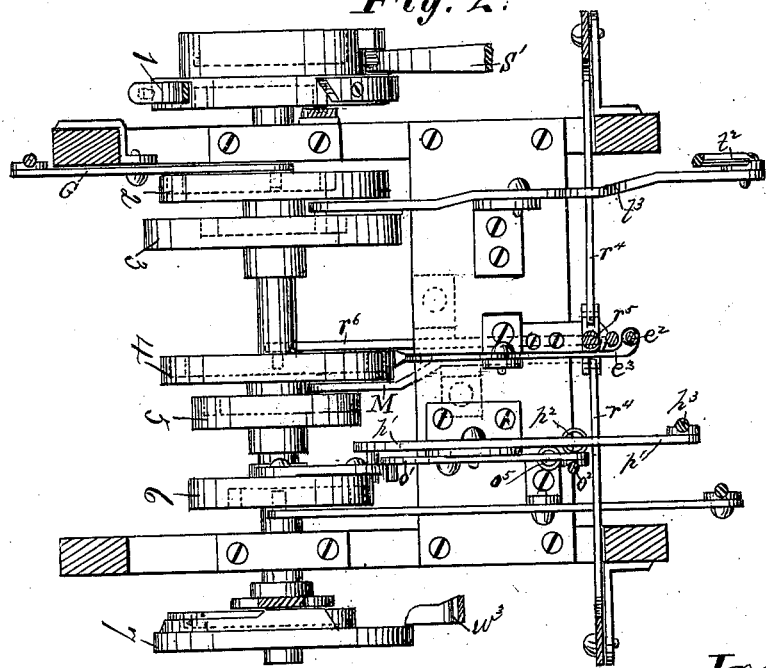
Figure 10:
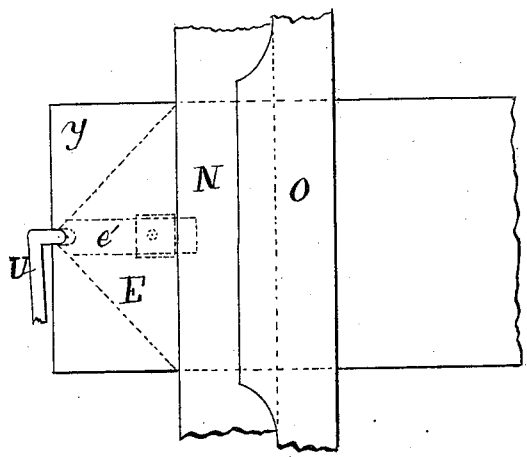
Figure 12:
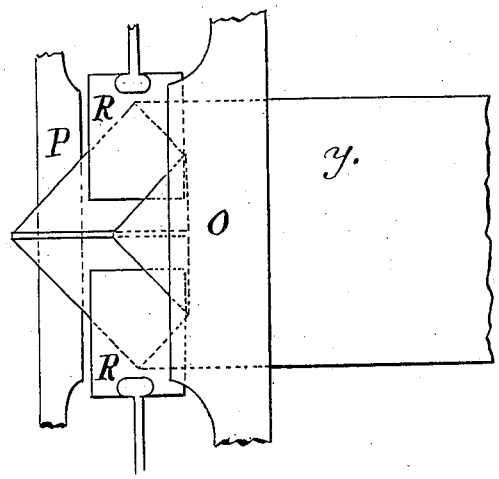

Figure 1 is a plan of a machine embodying my invention, the parts being in the positions assumed by them after the nippers have given the first fold to the bottom of the bag, the bag or paper not being shown in this figure. Fig. 2 is a plan section taken through the line 2 2 of Fig. 3. Fig. 3 is an elevation of the delivering end of the machine; Fig. 4, a vertical longitudinal section through line 4 4 of Fig. 1; Fig. 5, a detail in section in the line 5 5 of Fig. 6; Fig. 6, a detail in plan in the line 6 6 of Fig. 5; Fig. 7, a detail in a different position; and Fig. 8 an elevation, and Fig. 9 a plan, showing some of the "forming" devices and the manner in which the nippers seize a single thickness of the paper composing the flattened paper tube. Figs. 10, 11, 12, and 13 are diagrams representing the successive stages of the automatic folding and finishing of the bottom of the bag, and illustrating parts of the mechanism employed in these operations.

A A is the skeleton tube-former, around which the paper is folded as it is automatically drawn into the machine from the delivery-roll after its edge has been supplied with paste, as above stated, these parts A A, in practice, extending backward, so as to reach near to the pasting devices, and being shown in the drawing as broken off at the receiving end of the frame A' A' of the machine.

B B are the paper-feeding rollers, having an intermittent motion, and serving to draw in the paper from the delivering-roll, and to feed out the finished bag at the other end of the machine. These rollers are made with central depressions or grooves, to permit the flat shover or shank $e^6$ to move forward and back between them to operate the former-plate E.

A" is also a part of the skeleton former, and is placed between the strips A A, and connected to them by cross-pieces C, as shown in Fig. 1, being a flattened tube, through which the shank or shover $e^6$ of the forming-plate E reciprocates; and it also serves as a bed or table for the hollow steam-box D, which sets or dries the newly-pasted side seam, the height to which the loosely-attached finger $e^1$ is shown as raised being exaggerated.

The strips or pieces A A and their rearward extensions may be changed for others, or they may be contracted or expanded in width, or rather adjusted laterally relatively to each other, in order to accommodate bags of different widths.

This skeleton former is secured to a hanger, $a^4$, from the frame A A, and is so connected to the hanger that one edge of the paper may pass under and the other or pasted edge may pass over the lower horizontal part of such hanger.

The steam-box D is located directly over the central part A″ of the skeleton frame or tube-former, and rests upon it a portion of the time; and it is arranged to be raised and lowered intermittingly at the proper periods by means of a bent lever, D′, to which it is attached, and which is operated by cam 1 on the cam-shaft X. This box may be heated by steam admitted at $o$ from any appropriate connections, and the water of condensation discharged at $n$ in any convenient manner. It is raised just before the paper is fed forward, and lowered as soon as the paper comes to a rest, the object being to partially dry the pasted side seam and to set the paste by heat and pressure, so that during the subsequent operations of folding the bottom of the bag, &c., the seam will remain intact.

E is the former-plate for giving form to the first fold of the bottom of the bag. It is of somewhat triangular form, its two forward edges being equally inclined toward each other, and an opening or notch being made at its apex or point. It carries a finger, $e^1$, also notched at its forward end, and an opening through the plate E allows this finger to be raised at certain periods above the plate by means of a lifting-rod, $e^2$.

F is a rocking arm at the rear of the machine, receiving its motion from cam 2 through the agency of lever G and a connecting-pitman, $g^1$, crank $g^2$, and rock-shaft $g^3$, to which the arm is attached. This rocking arm F, being connected to the shank or shover $e^6$ of the plate E, imparts to it, and consequently to the finger $e^1$, their longitudinal reciprocating motions.

H is a plate or table extending transversely across the machine, and it is supported by vertical rods $h$ $h$, held by guides $h'$ $h'$ near their upper ends, their lower ends being connected to the cross-piece K, this latter being supported and operated by the standard L and lever M through the instrumentality of cam 5. N is a crimping-plate extending transversely across the machine and partly over the table H, its front edge reaching to the center of this table. It is supported on vertical rods $n^1$, the upper ends of which are held by guides $n^2$, the lower ends being connected at $n'''$ to one end of the oscillating levers J, which have their fulcra on studs $r$ at their centers. The other end of each of said levers J are connected to and near the lower ends, respectively, of the vertical rods $h$ $h$, thus giving the table H and the crimping-plate simultaneous movements, the one rising as the other descends, and vice versa.

R R are side holders or guides, the width of which determines the width of the bottom of the bag. They may be made of any desired width adapted to the size of the bag, and may be removed and exchanged, as need be, for others of any required size. They are attached to arms or levers $r^1$, (see Figs. 5 and 7,) which are severally connected to the slides $r^2$, a spring, $r^3$, serving to bear down upon the rear end of each of the levers $r^1$, and thus tending normally to throw upward the holders R R when they are not required to be forced downward. The slides $r^2$ are severally connected to an angle-lever, $r^4$, and these levers at their lower and inner ends are pivoted to a vertical rod, $r^5$, which connects with a lever, $r^6$, which derives its motion from cam 4. Thus the movements of the side folders inward and outward are coincident and simultaneous.

As the slides and the levers $r^1$ are thus moved within the hollow arm $r^7$ each of these last-named levers, at the forward motion, rides at its depressed rear end over the tip of an adjustable screw, $r^8$, and thereby forces downward the holders R R, so as to press the paper close down upon the crimping-plate N and table H.

O is the first folding plate or bar for forming one of the points of the bottom of the bag, and it is operated to have a forward and back movement by means of cam 6 through the instrumentality of the cam-lever $o^1$, rod or pitman $o^2$, and cranks or arms on the rock-shaft $o^4$. A reacting-spring, $o^5$, is connected with lever $o^1$.

P is the second or last point-folder, operated also forward and backward by means of the same cam 6 through the instrumentality of the cam-lever $p^1$, its reacting-spring $p^2$, rod or pitman $p^3$, cranks $p^4$, and rock-shaft $p^5$.

U is a pair of nippers for catching and folding back the first fold which is given to the bottom of the bag. They are operated by cam 1 through the cam-levers S S$^1$ and their connections. A hub or collar, $u^1$, working loosely upon one of the hollow arms, through which one of the side-folders R moves, carries the nipper-arm $u^2$, holding it between ears $u^3$, which ears also carry a dog, $u^4$, to operate a pusher or plunger, $u^5$, the front end of which is made wedge-shaped to work between the rear ends of the nippers, and thus close them at their forward or nipping end. The nipper-arm $u^2$ is fulcrumed on pin $u^6$ and the dog $u^4$ is fulcrumed at $u^7$.

When, by the action of the lever S$^1$, the sliding collar $s^2$ on the hollow arm $r^7$ carries forward the cam-piece $s^3$, the point $u^8$ of the nipper-arm first rides upon the straight part of the cam-piece $s^3$, bringing the nippers into the position shown in Figs. 5 and 6. The further advance of cam-piece $s^3$ raises the toe of dog $u^4$, forcing forward the plunger and closing the nippers upon the upper sheet or thickness of the flattened paper end, in the manner illustrated in Fig. 8, in which the dotted lines indicate the paper.

The nippers are made to describe a path of about half a circle, also illustrated by dotted lines in the same figure, by the following-named means: The lever S, through its link-connection with the toothed segment-arm V, whose teeth engage with the teeth on the hub or collar $u^1$ at the properly-timed periods, causes this hub to make about a half-revolution, and carrying with it the nipper-arm and nippers; and an appropriate projection on cam 1, at the proper juncture, returns the hub and nippers to their original or starting point, and during these movements the nippers are again opened at the proper period, to be ready for seizing the paper for the next bag by the withdrawal of the plunger $u^5$ and the action of an appropriate reacting-spring.

The finger $e^1$ attached to the former-plate E is designed for opening the end of the paper tube upon making the first bag, or after a previously-made bag has been cut off, so that the nippers may take hold of one side only of such bag, as shown in Fig. 8. This finger $e^1$ is not a spring, nor does it in any way act as a spring, but positively only in all its working movements. It is loosely attached or riveted at or near one end, the fastenings being purposely left loose, or leaving the finger loose enough thereon to form a joint, so that when lifted it shall fall back to place by its own gravity, and thus with certainty occupy its proper position for every successive lifting movement. Between its extremities it has a downward bend or depression, adapted to project into the open space or recess in the former-plate E, and when lifted this depressed part promptly responds to the lifter or plunger as the latter, in rising, presses upward the paper which is beneath it, thus crimping the paper upward into the recess or opening, elevating the finger, and with it the paper above the finger and former-plate E. In practice, this finger is lifted but a small distance at its outer end—say, from a half to five-eighths of an inch. This finger $e^1$ lies, together with the former-plate, within the flattened paper tube, and its forward end is raised by means of the lifting-rod $e^2$, the upper end of which is held in position and guided by a bracket through a hole in which this rod passes, the bracket being fastened to the under side of the table H. The lower end of this rod is connected to a lever, $e^3$, which is actuated by cam 5 at the proper periods.

The former-plate, as before stated, has a large opening, marked $e^4$, or recess, at about its center, and across which the finger $e^1$ lies, and into which it is preferably depressed, so that this rod $e^2$ may lift it sufficiently to permit one jaw of the nippers to enter the tube of paper and beneath its upper side, while the other jaw is above the same, thus avoiding any possibility of indenting, straining, or punching the paper by the lifting action of the rod, and affording a certainty that the nippers shall not seize the lower or under side of the flattened paper tube.

A notch, $e^5$, in the angle or apex of the former E and a corresponding one in the finger $e^1$ prevent the nippers seizing either the tip of the finger or of the former, and facilitate the action of the nippers in such seizure and in the commencement of its semicircular path to turn over and commence the folding and shaping of the bottom of the bag.

T is a paster for pasting the bottom of the bag. It is operated by a lever, $t^1$, which is connected, by a link, $t^2$, with a cam-lever, $t^3$, which is actuated by the cam 3. The upper end of $t^1$ is pivoted to a slide, $t^4$, which carries this paster-brush T. This slide, by means of guides which run in irregular slots in a vertical plate, $t^5$, secured to a bracket, $t^6$, gives to the brush its proper movement to receive its paste from the pasting-roller $t^7$ in the paste-cup $t^8$, and also downward and other movements to deliver its paste to the proper part of the folded bottom of the bag, and then to withdraw therefrom and return to its original position, ready for the next pasting action. The place on the bottom of the bag at which it deposits the paste is distinctly shown in Fig. 11.

W is a pad, which is brought down upon the folded bottom, to cause the folded parts to adhere more closely together after the bottom is fully folded and before the folders commence to recede. It is then raised a little, and acts as a guide to keep the folds from rising, so as to prevent their passage through the shears, hereinafter mentioned, when the bag is fed forward by the feed-rolls. This pad is operated at the proper periods through the agency of its rock-shaft $w^1$, crank $w^2$, and cam-lever $w^3$, which latter is actuated by a cam-projection on the driving or hand wheel 7, a coiled spring, $w^4$, on the shaft $w^1$ serving to return the pad to its normal position.

$C^1$ $C^1$ are the shears for cutting off from the tube the finished bag, one of the blades of these shears being preferably stationary.

The feed-rollers B are driven by appropriate gears $b^1$ $b^2$ and a pawl or clutch, $b^3$, connected to a yoke-bar, $b^4$, which is actuated from the main shaft.

Figure 11:
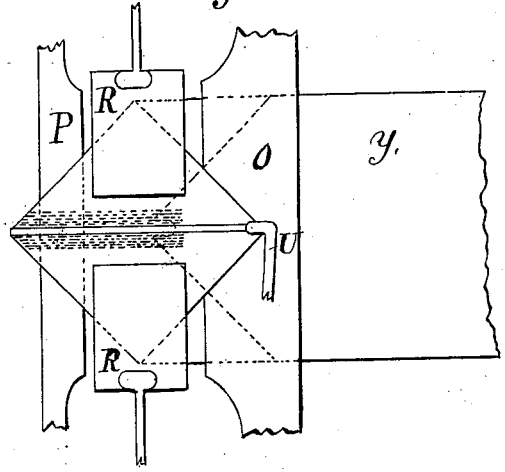
Figure 13:
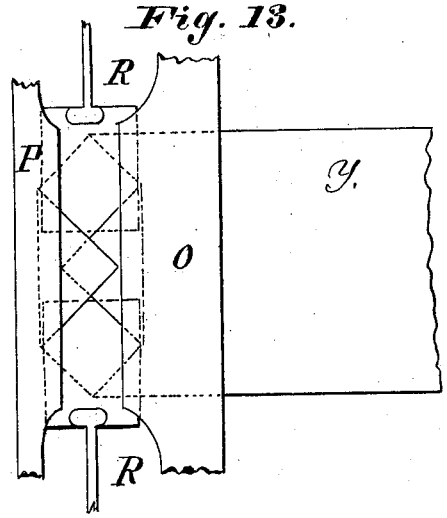

The operation of the machine is as follows: The operator first puts the roll of paper into the machine, as above described, the two edges of the paper (one being pasted) which form the seam of the bag first coming together after they pass the crooked hanger or bracket $a^4$ which supports the skeleton frame A A, and at the rear end of the steam-box the unpasted edge passing under and the pasted edge passing over the lower or horizontal part of the bracket, and both edges together passing under the steam-box and on the top of the tubular central part A'' of the frame, the steam-box resting upon the seam whenever it (the seam) is at rest. The paper is now in the form of a flat tube, which envelops the frame A A, and as it is drawn forward by the rolls B B it passes under the crimping-plate N and over the table H, also enveloping the former plate E, and its finger $e^1$ passing over the last point-folder P to and through the shears, where the end of the tube (or a finished bag) is cut off. The former-plate E is now brought forward to its working position, (the point of it being nearly up to the shears,) and at the same time the tube is fed forward for each successive bag. As soon as the paper tube comes to rest the table H rises and the crimping-plate N drops, thereby clamping the tube tight. At the same the top shear - blade descends, cutting off the tube. The nippers U follow the shear-blade in its descent to nearly a horizontal position, and rest in this position, to commence their work as soon as the tube is cut off. The finger $e^1$ is raised by the rod $e^2$, thus opening the end of the tube, as seen in Fig. 8, the nippers then taking hold of the raised part of the paper F, (see Figs. 8 and 10,) the end of the finger being notched, as stated, so as to admit of taking hold of the paper only. They (the nippers) are then, by means of their connection with cam 1, given a nearly half-revolution, descending slowly, and almost halting toward the last of this motion, when the holders R R approach each other, crimping down the paper, all as shown in Fig. 11, the end of the bag at this stage assuming the diamond form shown in that figure, and the edges of the bottom being close together. After the nippers have folded the paper back across the edge of the crimping-plate and the side-folders have partially crimped the sides, and before either of them have completed their work, the table H is lowered a little, raising the crimping-plate correspondingly, thus releasing its gripe upon the paper, and consequently upon the former-plate, which is quickly withdrawn beyond the front edge or beneath the crimping-plate, which, with the table, instantly comes together again, clasping the paper between them, when the nippers drop flat, and the side-folders complete their movement, closing closely down upon the paper. While the nippers are folding the paper back, and when well over, the paster starts and follows the movements of the other parts as closely as is allowable, so as to touch the paper and put on the paste, as seen in Fig. 11, as soon as it (the paper) is folded flat. After the paster touches the paper it continues a sliding horizontal movement a short distance and returns, thus brushing the paste on and making better work than simply printing it on. The paster returns quickly out of the way of the first point-folder O, which then does its work, (see diagram 12,) followed by the second or last point-folder P, (see diagram 13,) completing all the folds. The pad W now comes down upon the points not covered by the folders, pressing them down flatly, causing the paste to adhere, and completing the bag. The side-folders now commence to withdraw, the point-folders O and P keeping their position until the folders are so far withdrawn as to be clear of the points of the bottom of the bag that may have been folded over them When the folders O and P return to their respective positions, the pad W rises, (in an operating machine about one-half inch.) The table H now drops, raising the crimping-plate N, leaving the paper all free. The feed-rolls now commence to feed the paper along, the pad W remaining raised, but little above it, acting as a guide until the bottom of the bag has entered and passed the shears, when it rises to its former position.

The rolls may be adjusted to feed any desired length. While they are feeding forward and outward one of the finished bags, and also drawing along the paper tubing for another, the former-plate is coming forward at the same time to its position to form the bottom of the next bag.

I claim—

1. The suspended skeleton frame consisting of the tubular part A″, the non-tubular side pieces A A connected thereto, the whole being supported at the rear end by the hanger $a^4$, bent horizontally at its lower end to admit one edge of the paper, and resting at its forward end upon the lower one of the grooved feed-rollers B, as and for the purposes described.

2. In combination, the rocker-arm F, the tube A″, suspended and supported as described, the reciprocating shank or shover $e^6$ and its triangular former, and the recessed or grooved rollers B B, substantially as and for the purposes described.

3. The triangular former E, provided with the notch $e^5$ at its tip or point, and with the opening $e^4$ through its body, as and for the purposes set forth.

4. The combination of the crimping-plate N and the table H, these parts being constructed and operated as shown and described.

5. In combination with the former E, the finger $e^1$, loosely attached thereto, and a lifting device operating to elevate said finger, the construction permitting the finger, when released by the lifter, to freely drop to place by its own gravity, as and for the purposes described.

6. The nippers U, combined with the arm $u^2$, pusher $u^5$, collar $u^1$, and sliding collar $s^2$, substantially as and for the purpose set forth.

7. The side holders or guides R R, operated in the manner and for the purpose described, in combination with the table H, plate N, and folders O P, substantially as shown and described.

8. The side holders or guides R R, in combination with the lever $r^1$, spring $r^3$, slide $r^2$, and lever $r^4$, substantially as shown and described.

9. In combination with the stationary paste-cup $t^3$ and its pasting-roller $t^7$, the paster-brush T, having the movements, substantially as described, derived from the slide $t^4$, slotted guide-plate $t^5$, link $t^2$, and lever $t^1$, as shown and set forth.

10. In combination with the frame A A A″, the steam-box D, its operating-lever D′, and cam 1, substantially as shown, and for the purpose described.

11. The feed-rollers B B, grooved as described, in combination with the skeleton frame A A'', and with the bar or arm $e^6$ of the former-plate E, the combination permitting this bar to operate the former at the same time that the feed-rollers are feeding the paper.

12. In combination, the tube-former A A A'', the intermittingly-acting steam-box, grooved feed-rollers B B, and the described devices for forming the bottom of the bag.

13. In combination, the tube-former A A A'', steam-box D, grooved rollers B B, bottom-forming devices, and the pressure-pad W, the combination operating as set forth.

14. In combination, the tube-former A A A'', steam-box D, grooved rollers B B, bottom-forming devices, pressure-pad W, and the paster T, the combination operating as set forth.

15. In combination, the tube-former A A A'', steam-box D, grooved rollers B B, bottom-forming devices, pressure-pad W, paster T, and the shears C C', the combination operating as set forth.

In testimony that I claim the foregoing as my own I affix my signature in presence of two witnesses.

ALMON B. GLOVER.

Witnesses:
CHARLES H. COE,
BENJ. L. COE.